United States Patent
Chueh et al.

(10) Patent No.: US 9,178,723 B2
(45) Date of Patent: Nov. 3, 2015

(54) METHOD FOR PROVIDING NETWORK MAP THROUGH GATEWAY DEVICE AND THEREBY ASSISTING USER IN MANAGING PERIPHERAL NETWORK DEVICES

(75) Inventors: Aaron Chueh, Taipei (TW); Ya-Hui Huang, Taipei (TW)

(73) Assignee: D-LINK CORPORATION, Taipei (TW)

( * ) Notice: Subject to any disclaimer, the term of this patent is extended or adjusted under 35 U.S.C. 154(b) by 898 days.

(21) Appl. No.: 13/064,007

(22) Filed: Mar. 2, 2011

(65) Prior Publication Data
US 2012/0151364 A1 Jun. 14, 2012

(30) Foreign Application Priority Data
Dec. 10, 2010 (TW) .............................. 99143169 A

(51) Int. Cl.
G06F 3/0481 (2013.01)
H04L 12/66 (2006.01)
G06F 3/048 (2013.01)

(52) U.S. Cl.
CPC ............ *H04L 12/66* (2013.01); *G06F 3/04817* (2013.01); *G06F 3/048* (2013.01)

(58) Field of Classification Search
CPC ...... H01L 12/66; G06F 3/04817; G06F 3/048
USPC ........................................................ 715/736
See application file for complete search history.

(56) References Cited

U.S. PATENT DOCUMENTS

| | | | |
|---|---|---|---|
| 6,442,144 B1 * | 8/2002 | Hansen et al. | 370/255 |
| 6,496,862 B1 * | 12/2002 | Akatsu et al. | 709/224 |
| 8,307,068 B2 * | 11/2012 | Schuler | 709/224 |
| 2002/0143770 A1 * | 10/2002 | Schran et al. | 707/10 |
| 2005/0099962 A1 * | 5/2005 | Matsuda | 370/254 |
| 2005/0131991 A1 * | 6/2005 | Ogawa et al. | 709/201 |
| 2008/0040472 A1 * | 2/2008 | Kato et al. | 709/224 |
| 2008/0120635 A1 * | 5/2008 | Trimper et al. | 725/25 |
| 2008/0229208 A1 * | 9/2008 | Sahashi et al. | 715/736 |
| 2009/0059935 A1 * | 3/2009 | Dec | 370/401 |
| 2009/0183254 A1 * | 7/2009 | Franco et al. | 726/17 |

FOREIGN PATENT DOCUMENTS

JP 2003052093 A * 2/2003

* cited by examiner

*Primary Examiner* — William Bashore
*Assistant Examiner* — Gregory A Distefano
(74) *Attorney, Agent, or Firm* — Bacon & Thomas, PLLC

(57) ABSTRACT

The present invention is applicable to a gateway device, which is configured with an icon list storing a plurality of icons each corresponding to a specific network device type and is able to search for all active or passive network devices currently connected thereto, read basic data of each network device thus found, read the icon corresponding to each network device from the icon list, and then convert the icons thus read and the basic data of each network device found into a web page message for creating a network device map web page. Thus, when the gateway device sends the web page message to the active network device, a user of the active network device can see each icon on the network device map web page by using a browser and instantly know the network devices currently connected to the gateway device and their basic data.

5 Claims, 7 Drawing Sheets

METHOD FOR PROVIDING NETWORK MAP THROUGH GATEWAY DEVICE AND THEREBY ASSISTING USER IN MANAGING PERIPHERAL NETWORK DEVICES

BACKGROUND OF THE INVENTION

1. Technical Field

The present invention relates to a gateway device, more particularly to a method for providing a network map through the gateway device, which is configured with an icon list for storing a plurality of icons each corresponding to a specific network device type, and is able to search for all active or passive network devices that the gateway device currently connects to and convert the icons thus read and the basic data of each network device found into a web page message for creating a network device map web page, thereby assisting a user in managing peripheral network devices, 2. Description of Related Art With the advancement of network transmission technology and due to the rapid growth of and the various value-added services provided by commercial Internet service providers (ISPs), people nowadays are familiar with and accustomed to using all kinds of network applications such as World Wide Web (WWW), electronic mail (e-mail), file transfer via the File Transfer Protocol (FTP), the Bulletin Board System (BBS), and remote terminal emulation (e.g., Telnet). Many schools and companies have also begun providing distance education programs or holding transnational meetings through video conference.

Indeed, the dynamic development of Internet applications has connected people's working modes, friend-making activities, and hobby cultivation closely to the Internet. In order to satisfy the need to make Internet connection from different locations, a variety of network devices were designed and are now commercially available, such as desktop computers and laptop computers that are configured for wired connection; smart phones and personal digital assistants (PDAs) that are configured for wireless connection; and access points, switches, hubs, and routers that are used to construct a local network environment. Apart from that, many non-network devices can be additionally provided with network interface cards so as to be shared by many people via network connection; some common examples of such modified devices are network printers and network scanners. The aforementioned network devices, though capable of Internet connection and providing various convenient services, have their shortcomings. Take a home network system composed of a plurality of network devices for example. The number of the network devices may be so large that it is unlikely for the user to know exactly how many network devices there are in the current network environment. This not only causes difficulty in management, but also prevents the user from rapidly locating any malfunctioning network device (e.g., a network device that cannot make Internet connection). In fact, the malfunctioning network device cannot be identified until it is actually used, which can be a serious problem if the user has to connect to the Internet using that particular network device at the very moment.

Furthermore, it is now common practice to use a Digital Subscriber Line (DSL) router to connect a plurality of network devices in a home network to the external Internet. If the parents decide to block certain websites whose contents are considered inappropriate for their children, the addresses of such websites can be added to a blacklist of the DSL router. A "blacklist" is a list that is stored in a network device, stores a plurality of user-input website addresses, and functions in such a way that, if an attempt is made to connect the network device to any of the websites in the blacklist, the network device will automatically deny such connection. However, once a blacklist is created in the DSL router, all the network devices that depend on the DSL router to connect to the Internet are kept from visiting the websites in the blacklist. If the parents, as required by work, have to visit one of those websites, it is necessary to remove the website from the blacklist and, after visit, put the website back into the blacklist. The foregoing process, in addition to being inconvenient in itself, substantially limits and restricts the time window in which the parents can visit the websites in the blacklist, for the removal of websites from the blacklist can only be done when the children are asleep or at school so as to prevent the children from accessing those websites at the same time.

If it is desired to create a blacklist only in certain network devices or to set the Internet access time limit of certain network devices (e.g., the children's computers are allowed Internet access only from 8 am to 9 pm on Saturdays, or a network printer is available over the network only from 5 pm through 11 pm), the user must install specific management software into the target network devices according to their respective network device types and set each and every target network device. When the settings need to be changed at a later time, the target network devices must be reset one after another, which is extremely inconvenient. If the network system includes so many network devices or if the setting was done so long ago that the user cannot be sure which network device has been set or what has been set, the only way to figure it out is to check each network device for its settings, which is unfavorable to management.

Besides, most of the network device management software nowadays needs to be additionally installed from CDs, and the management interface is typically shown in text. The text-based management interface not only is user-unfriendly in terms of viewing, but also may include network device-related jargons that are very likely to deter the user from performing the setting procedure or require the user to consult the manufacturer of the intended network device in order not to set the unintended network devices by accident. Therefore, if a more convenient management method is developed and made available to the public, it will no doubt be rapidly adopted by users and effectively take a strong market share in the network industry. The issue to be addressed by the present invention is to design a management interface that is easy to view, enables convenient management, and thereby overcomes the aforementioned drawbacks of the prior art.

BRIEF SUMMARY OF THE INVENTION

In view of the fact that the conventional management software uses user-unfriendly text-based interfaces, is applicable only to a single network device or network devices of the same type (e.g., printers, desktop computers, etc.), and thus causes difficulty in management, the inventor of the present invention conducted extensive research and repeated trials and finally succeeded in developing a method for providing a network map through a gateway device and thereby assisting a user in managing peripheral network devices. The method disclosed herein is intended to provide users with a more agreeable and intuitive management experience and help related companies secure their positions in the network industry.

It is an object of the present invention to provide a method for providing a network map through a gateway device and thereby assisting a user in managing peripheral network devices. The method is applicable to a network system, wherein the network system includes a gateway device (e.g., a DSL router, a gateway, a modem, etc.) and at least one active network device (e.g., a smart phone, a laptop computer, a PDA, etc.). The gateway device is connected to the at least one active network device. The at least one active network device and at least one passive network device (e.g., a printer, a switch, a wireless access point (AP), etc.) cannot connect to the external Internet unless through the gateway device. The gateway device is configured with an icon list which stores a plurality of icons, wherein each icon corresponds to a specific network device type. The method is carried out in the following manner. The gateway device, once activated, searches for all the active or passive network devices that the gateway device can currently connect to. Then, the gateway device reads the basic data (e.g., IP, MAC, name, wireless signal intensity, blacklist, white list, etc.) of each network device thus found. The gateway device also reads from the icon list the icon corresponding to each network device that the gateway device is now connected to. Afterward, the gateway device converts the icons thus read and the basic data of each network device found into a web page message for creating a network device map web page. Upon receiving and reading a service request instruction from one of the at least one active network device, the gateway device sends the web page message to the active network device. Thus, by means of a browser of this active network device (e.g., a computer), the user can see each icon on the network device map web page and instantly know the network devices to which the gateway device is currently connected and their basic data.

It is another object of the present invention to provide the foregoing method, wherein the gateway device further includes a blacklist or a white list. After the network device map web page is created, the gateway device may receive a blacklist write-in instruction or a white list write-in instruction. The gateway device will read the website address and the network device identification code contained in the blacklist or white list write-in instruction and then, according to the network device identification code, stores the website address into the blacklist or the white list at a location corresponding to the network device identification code. Thus, the user can create different blacklists or white lists for different network devices and their users (e.g., the user's children) respectively to enhance network security. The management of network security is also made easy.

It is yet another object of the present invention to provide the foregoing method, wherein the gateway device, upon receiving a change instruction from the browser of one of the at least one active network device after the network device map web page is created, reads the setting request and the network device identification code contained in the change instruction, converts the contents of the setting request (e.g., to change the existing IP, password, SSID, etc.) into a setting message, and sends the setting message to the active or passive network device corresponding to the network device identification code, thereby changing the basic data of the corresponding active or passive network device. Therefore, not only can the network devices that the gateway device is currently connected to be easily identified by the icons in the browser, but also all such network devices can be set by way of any one of the at least one active network device (e.g., a computer). The convenience of management is thus substantially increased.

BRIEF DESCRIPTION OF THE SEVERAL VIEWS OF THE DRAWINGS

A detailed description of further features and advantages of the present invention is given below with reference to the accompanying drawings, in which.

DETAILED DESCRIPTION OF THE INVENTION

In consideration of the fact that a gateway device (e.g., a DSL router, a gateway, a modem, etc.) is indispensable in connecting the network devices in a home network system to the external Internet (i.e., all the network devices in the system must be connected to the gateway device either directly or indirectly) and that network devices are generally installed with browsers to enable the browsing of web pages, the inventor of the present invention designed a method for presenting a network device map by way of graphical icons and directly using a gateway device to manage peripheral network devices, with a view to providing users with an easy-to-use and intuitive management environment. It should be noted that the term "active network device" as used in the following embodiments refers to a network device in which a browser (e.g., Internet Explorer, Firefox, Google Chrome, etc.) can be installed and which provides a management interface to be viewed by the user so as for the user to perform an active setting procedure via the management interface. Some notable examples of active network devices are smart phones, laptop computers, and PDAs. A "passive network device", on the other hand, refers to a network device that can only be operated and set, such as a printer, a switch, a wireless access point (AP), a multi-media player, and so on.

Figure 1:
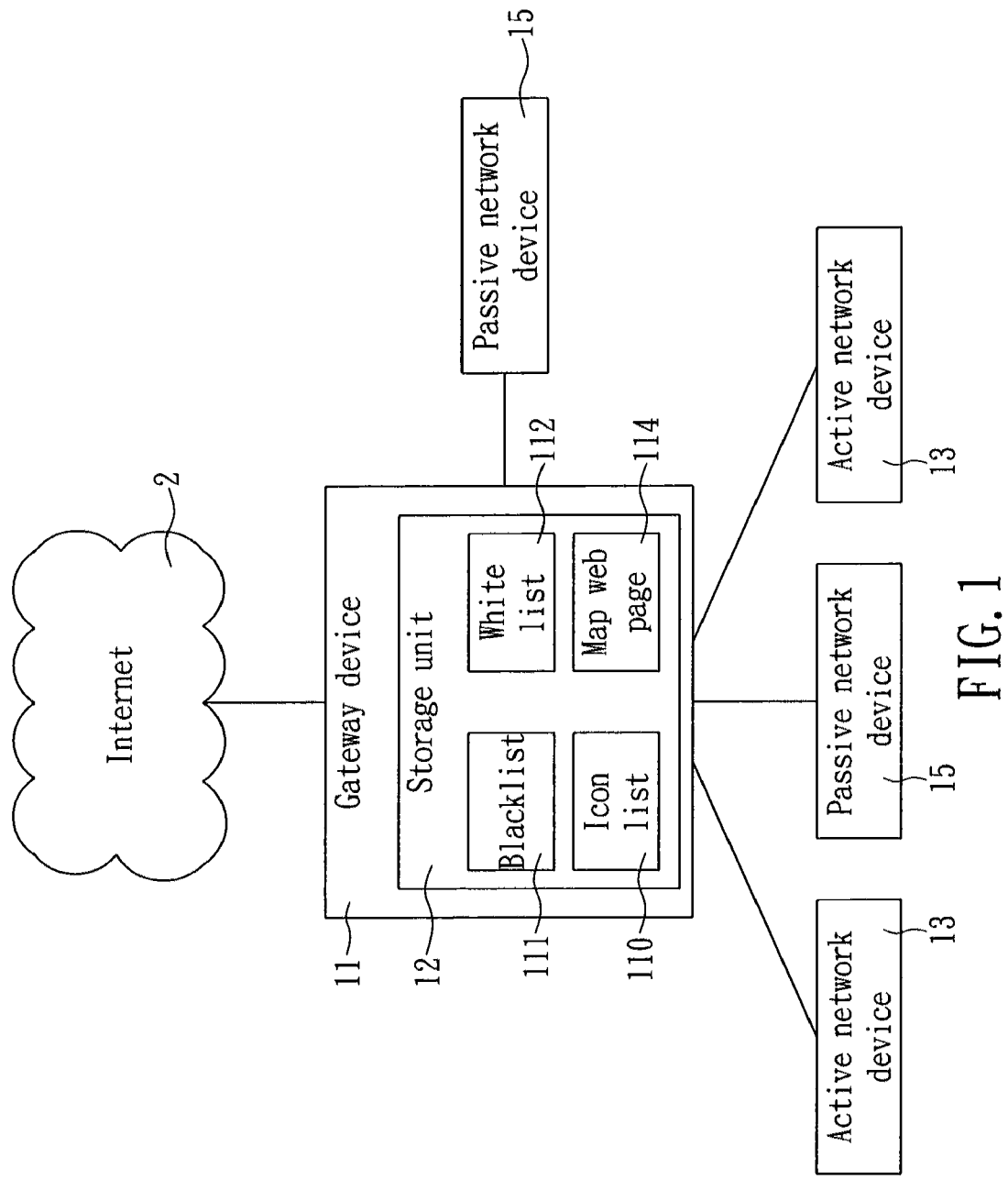
FIG. 1 shows a network structure.
Figure 2:
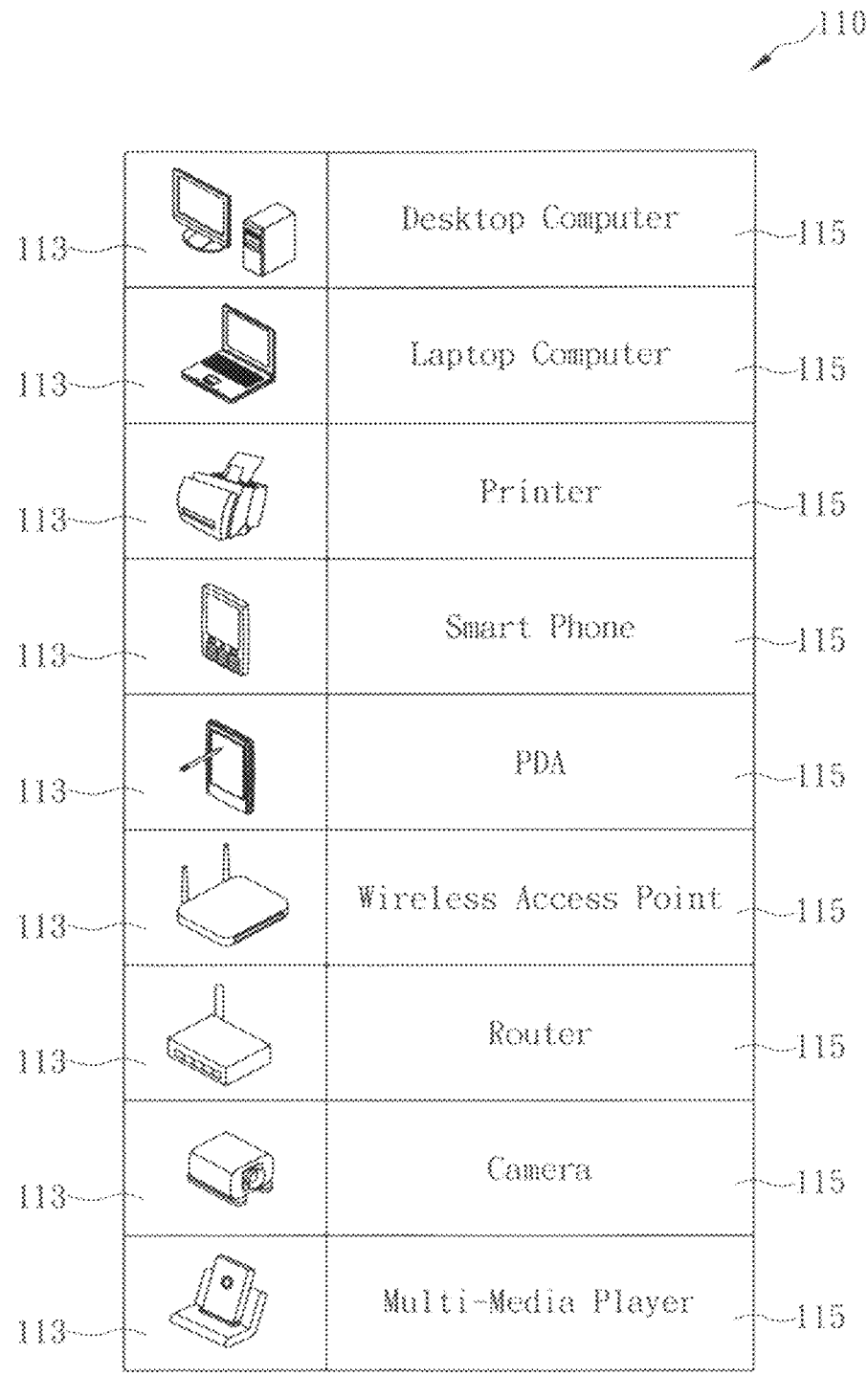
FIG. 2 shows the contents of an icon list.

The present invention provides a method for providing a network map through a gateway device and thereby assisting a user in managing peripheral network devices. The method is applicable to a network system which includes a gateway device and at least one active network device. In an embodiment of the present invention as shown in FIG. 1, a gateway device 11 is connectable to a plurality of active network devices 13 and a plurality of passive network devices 15 so that the plural active or passive network devices 13, 15 can connect to the external Internet 2 via the gateway device 11. The manner of connection described above is provided by way of example only. In other embodiments of the present invention, the number of the active network devices 13 and the number of the passive network devices 15 can be arbitrarily changed, or the gateway device 11 can be connected to only one active network device 13. The gateway device 11 is provided with a storage unit 12, which can be a flash memory to suit the manufacturer's production requirements but is not limited thereto. The storage unit 12 stores an icon list 110 and a map web page 114. Referring to FIG. 2, the icon list 110 stores a plurality of icons 113, wherein each icon 113 corresponds to a specific network device type 115. The map web page 114 is built-in with a basic web page structure. When activated, the gateway device 11 searches for all the active network devices 13 or passive network devices 15 to which the gateway device 11 can connect at the moment. For example, the gateway device 11 sends a broadcast packet to each of the network devices, and the receipt of a response packet signifies a connection established. The gateway device 11 can be provided with a register in which each network device that the gateway device 11 is connected to is entered. As there are a good number of applicable searching techniques, and the steps of the searching technique employed are not a technical feature of the present invention, a detailed description of such techniques is omitted herein.

With reference to FIGS. 1 and 2, once the gateway device 11 finds all the active network devices 13 or passive network devices 15 that the gateway device 11 is currently connected to, the gateway device 11 reads the basic data (e.g., IP, MAC, name, wireless signal intensity, blacklist, white list, etc.) of each network device 13, 15 found and, according to the network device identification code of each active or passive network device 13, 15 found, stores the basic data into the gateway device 11 at locations that correspond respectively to the network device identification codes. The "network device identification code" is a code whereby the gateway device 11 identifies each network device. More specifically, whenever the gateway device 11 finds a network device 13, 15 to which a connection can be made, the gateway device 11 records a unique network device identification code so that all such network devices 13, 15 will not be mixed up in a subsequent setting process. In practice, the network device identification code can be a Media Access Control (MAC) address, a preset code that is not visible to the user, or simply the name of each network device. The gateway device 11 identifies the network device type 115 of each network device 13, 15 found and reads the corresponding icon 113 from the icon list 110. For example, when the gateway device 11 finds an active network device 13 and identifies the network device type 115 of that active network device 13 as a "laptop computer", the gateway device 11 reads from the icon list 110 the icon 113 corresponding to laptop computers. Should the gateway device 11 fail to identify the network device type 115 of a network device 13, 15 found, the gateway device 11 will relate the network device type 115 of that network device 13, 15 to the icon 113 of an "unidentifiable device". After reading the icons 113 corresponding to the network device types 115 identified, the gateway device 11 integrates into the map web page 114 the icons 113 read and the basic data of each network device 13, 15 found, so as to create a network device map. That is to say, the gateway device 11 adds the icons 113 and the corresponding basic data into the basic web page structure of the map web page 114 to complete the network device map. Afterward, the gateway device 11 converts the network device map into a web page message for creating a network device map web page. In a different embodiment of the present invention, the map web page 114 is stored not in the gateway device 11 but in a remote server. In that case, the gateway device 11 downloads the map web page 114 from the remote server only when the gateway device 11 is about to generate a web page message. Alternatively, the icons 113 and the corresponding basic data can be directly converted into a web page message by a software program, instead of being integrated into the map web page.

Figure 3:
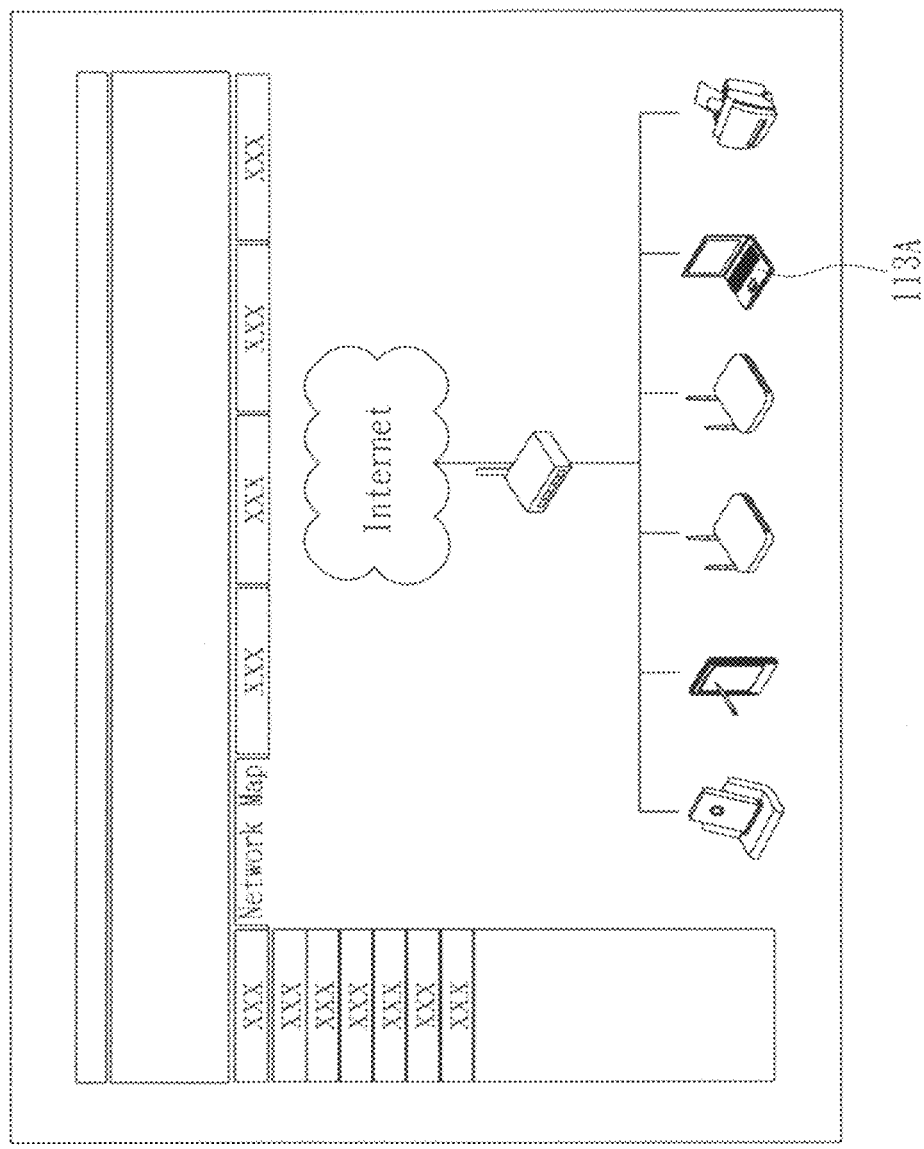
FIG. 3 shows the screen image of a network device map web page.

Referring again to FIGS. 1 and 2, in order to view the current network environment, the user can click the "Network Map" button (see FIG. 3) in the browser of any of the active network devices 13, thus triggering the active network device 13 to send a service request instruction to the gateway device 11. Upon receiving and reading the service request instruction, the gateway device 11 sends the aforesaid web page massage to the active network device 13 presently used by the user, so that the network device map web page is displayed in the browser of that active network device 13 (as shown in FIG. 3). Thus, simply by viewing the icons 113 on the network device map web page, the user will know which network devices are in the current network environment. In other words, the user-friendliness of the management interface is effectively increased.

Referring to FIGS. 1 and 2, at a predetermined interval (e.g., five minutes) after the gateway device 11 generates the web page message of the network device map, the gateway device 11 automatically searches for all the active network devices 13 or passive network devices 15 that the gateway device 11 is currently connectable to; reads the icon 113 and basic data corresponding to each such network device 13, 15; converts the icons 113 and basic data read into a web page message; and sends the web page message to the active network device 13 in use. Therefore, when any such network device 13, 15 is turned off and thus disconnected from the gateway device 11 or has its settings changed by another user, the network device map will show the corresponding state. For example, the icon 113 of a network device which has just been turned off will disappear from the network device map, while the remaining icons 113 on the network device map will allow the user to know the state of each network device 13, 15 in the current network environment.

Figure 4:
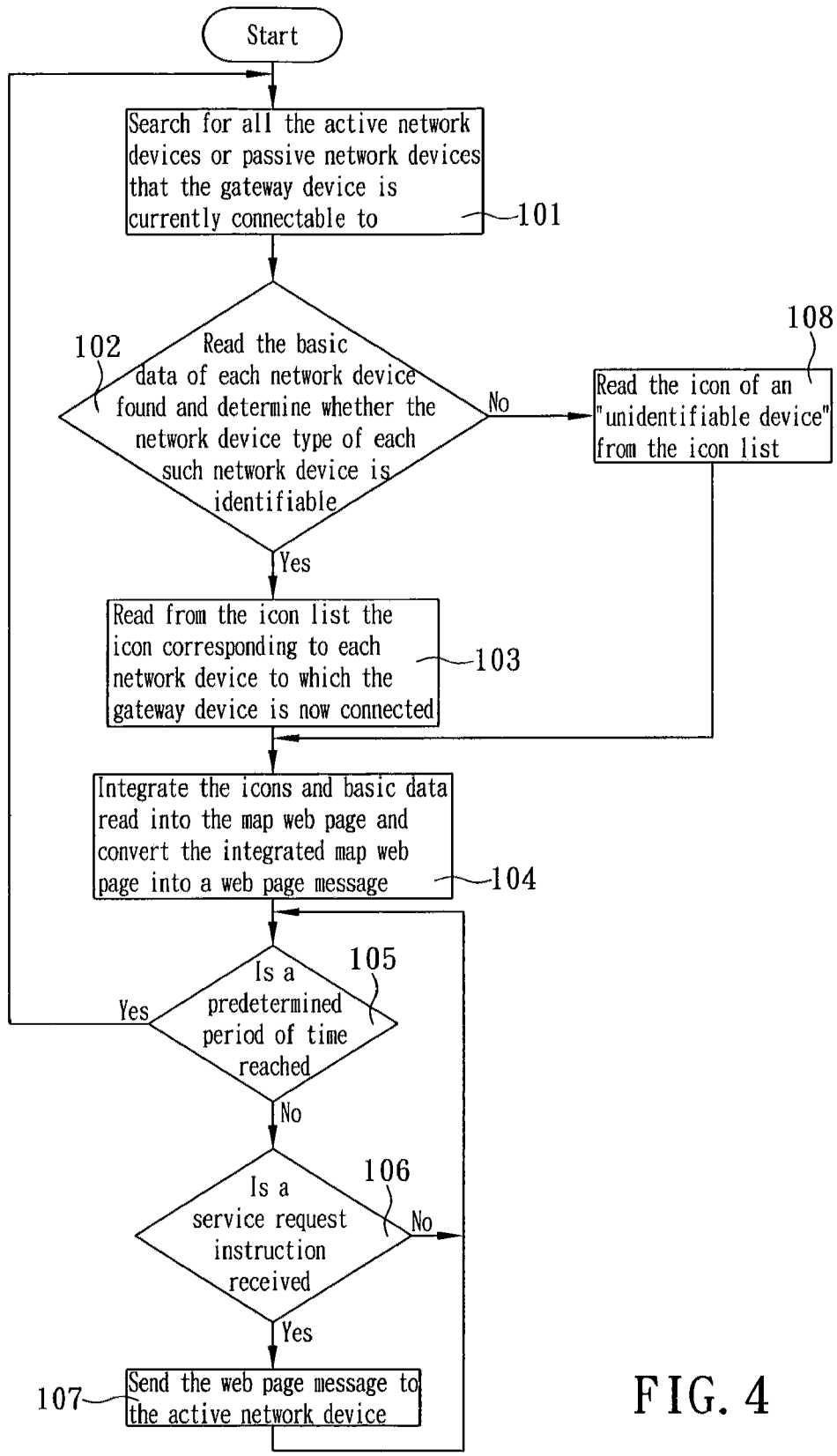
FIG. 4 is a flowchart of steps to be performed after a gateway device is activated.

To specifically disclose the process described above, the steps performed by the gateway device 11 after it is activated are detailed hereinafter with reference to FIG. 4 in conjunction with FIG. 1.

(101) The gateway device 11 searches for all the active network devices 13 or passive network devices 15 that the gateway device 11 can currently connect to. Go on to step (102).

(102) The gateway device 11 reads the basic data of each network device 13, 15 thus found and determines whether the network device type 115 of each such network device 13, 15 is identifiable. If yes, go on to step (103); otherwise, go to step (108).

(103) The gateway device 11 reads from the icon list 110 (as shown in FIG. 2) the icon 113 corresponding to each network device 13, 15 that the gateway device 11 is now connected to. Go on to step (104).

(104) The gateway device 11 integrates the icons 113 read and the basic data of each network device 13, 15 found into the map web page 114 and converts the map web page 114 into a web page message. Go on to step (105).

(105) The gateway device 11 determines whether a predetermined period of time is reached. If yes, go back to step (101); if not, go on to step (106).

(106) The gateway device 11 determines whether a service request instruction is received from the browser of one of the active network devices 13. If yes, go on to step (107); otherwise, go back to step (105).

(107) The gateway device 11 sends the web page message to the active network device 13. Return to step (105).

(108) The gateway device 11 reads the icon 113 of an "unidentifiable device" from the icon list 110 (as shown in FIG. 2). Return to step (104).

With reference to FIG. 1, according to the foregoing steps, the gateway device 11 creates a network device map and converts the network device map into a web page. Hence, without having to additionally install management software from a CD, the user can readily know which network devices 13, 15 are in the current network environment by viewing the browser. Moreover, since each network device 13, 15 on the network device map web page is shown by a corresponding graphic icon (as shown in FIG. 3), the user can identify the type of each network device 13, 15 intuitively, which facilitates subsequent management steps. It should be pointed out that, although the gateway device 11 in the foregoing embodiment generates the web page message upon being activated, it is feasible for the gateway device 11 in a different embodiment of the present invention to generate the web page message after the gateway device 11 receives the service request instruction from the active network device 13. In the latter case, only after the gateway device 11 receives the service request instruction will it integrate the icons 113 read and the basic data of each network device 13, 15 found into the map web page 114.

Figure 5A:
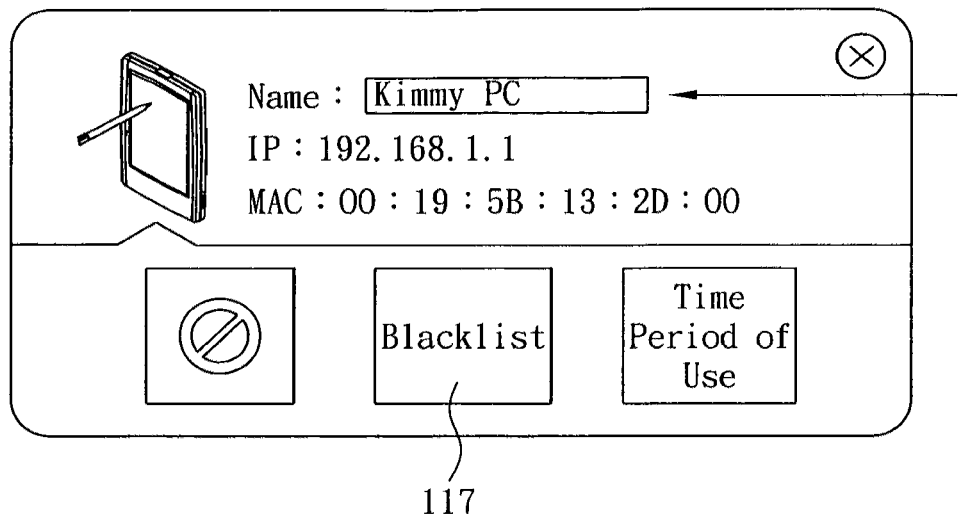
FIG. 5A shows a management screen.
Figure 5B:
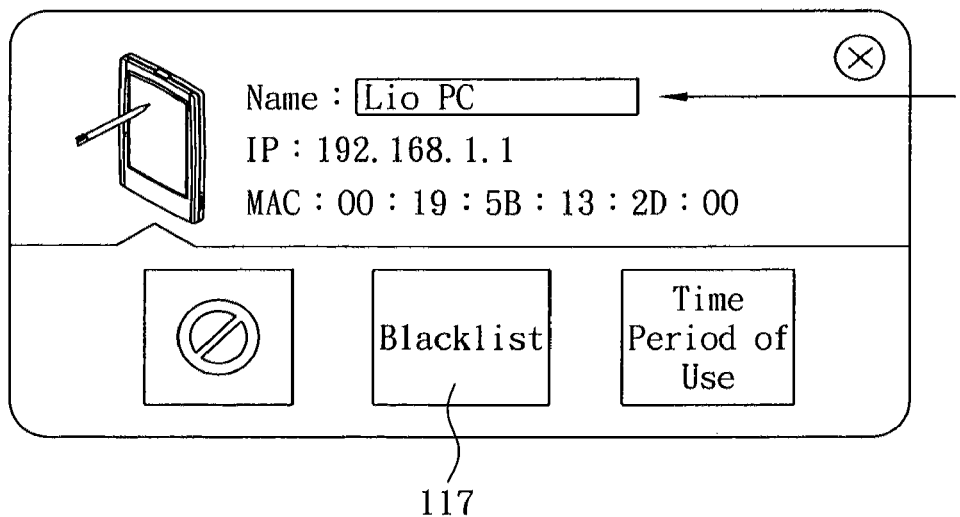
FIG. 5B shows the management screen of FIG. 5A after a name change.

In addition, when the gateway device 11 creates the network device map web page for the first time, the default data (e.g., name) of each network device 13, 15 are used, and yet users often prefer to manage or browse with settings they are familiar with. Therefore, according to the present invention, with reference to FIGS. 1 and 3, when it is desired to reset the data (e.g., name) of a certain network device 13, 15, the user can open the network device map web page using the browser of one of the active network devices 13 and directly click the icon of the intended network device 13, 15 (e.g., the icon 113A of a laptop computer as shown in FIG. 3). In response, a setting screen (as shown in FIG. 5A) pops up from the network device map web page. The user can use the active network device 13 to change the existing contents "Kimmy PC" of the name bar (as indicated by the arrow in FIG. 5A) in the setting screen to the intended name "Lio PC" (as indicated by the arrow in FIG. 5B), such that the active network device 13 sends a change instruction to the gateway device 11, wherein the change instruction contains a setting request (i.e., to change the name of the network device corresponding to the selected icon 113A to "Lio PC") and the network device identification code of the active network device 13. Upon receiving the change instruction, the gateway device 11 converts the contents of the setting request contained therein (i.e., to change the name of the network device corresponding to the selected icon 113A to "Lio PC") into a setting message and stores the setting message into the gateway device 11 at a location that corresponds to the network device identification code. Before sending another web page message to the active network device 13, the gateway device 11 will determine whether the location therein that corresponds to the network device identification code of the active network device 13 is already stored with a setting message. If yes, the contents of that setting message will be executed to adjust the data of the corresponding network devices 13, 15 in the network device map. Consequently, the network device map web page displayed by the active network device 13 will use the contents set by the user, thereby substantially increasing the convenience of management.

Figure 6:
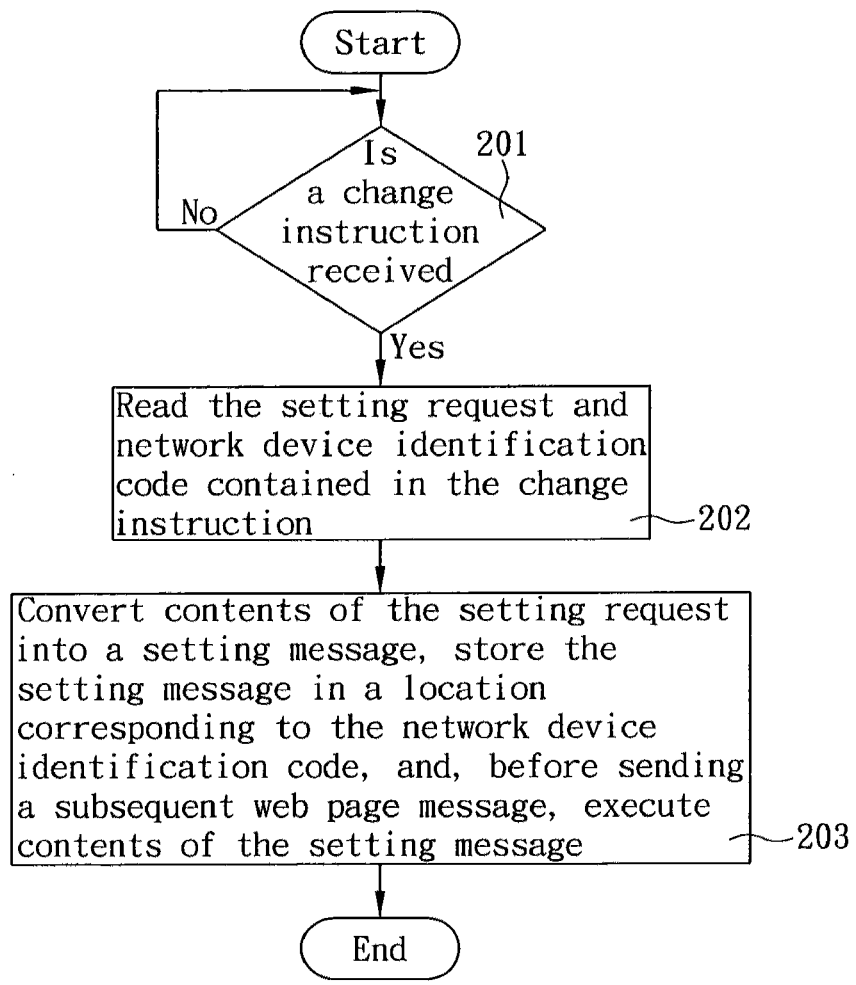
FIG. 6 is a flowchart of steps to be performed after the gateway device receives a change instruction.

To specifically disclose the process described above, the steps performed by the gateway device 11 are detailed hereinafter with reference to FIG. 6 in conjunction with FIG. 1.

(201) The gateway device 11 determines whether a change instruction is received from the browser of the active network device 13. If yes, go on to step (202); if not, return to step (201).

(202) The gateway device 11 reads the setting request and the network device identification code of the active network device 13 contained in the change instruction. Go on to step (203).

(203) The gateway device 11 converts the contents of the setting request into a setting message, stores the setting message into the gateway device 11 at a location corresponding to the network device identification code of the active network device 13, and before sending a subsequent web page message to the active network device 13, executes the contents of the setting message.

Thus, the user can change the data of different network devices on the network device map web page according to his or her own habits to effectively increase the convenience of management.

Figure 7:
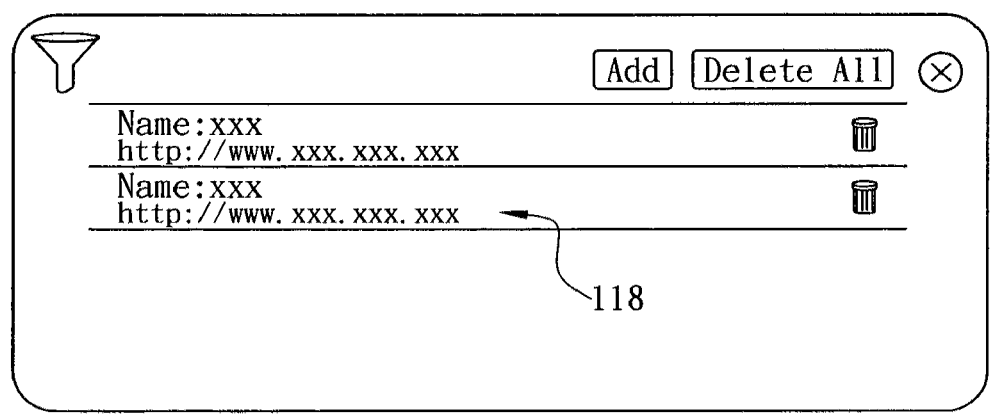
FIG. 7 shows a blacklist input page.

Moreover, referring to FIGS. 1 and 3, the storage unit 12 of the gateway device 11 further includes a blacklist 111 which records the network device identification codes of all the active network devices 13 that the gateway device 11 has connected to. If the user (say, user A) finds the contents of a certain web page inappropriate for another user (say, user B) of the network system and wishes to create a blacklist for the active network device 13 for use by user B, wherein the blacklist includes the address of that particular web page, user A can use the active network device 13 in hand and click the icon 113 in the network device map that corresponds to the active network device 13 for use by user B. In response to that, the browser of the active network device 13 being used by user A displays the setting screen as shown in FIG. 5A. Once user A clicks the "Blacklist" button 117 on the setting screen, a blacklist input page (as shown in FIG. 7) appears in the browser, so as for user A to input the intended web page address into the web page address field 118 of the blacklist input page. Then, the active network device 13 used by user A sends a blacklist write-in instruction to the gateway device 11, wherein the blacklist write-in instruction includes at least one web page address and a network device identification code. The gateway device 11 reads the web page address and the network device identification code in the blacklist write-in instruction and stores the web page address into the blacklist 11 at a location corresponding to the network device identification code. When any of the active network devices 13 attempts to connect to a web server in the external Internet 2 by way of the gateway device 11, the gateway device 11 will, according to the network device identification code of that active network device 13, compare the web page address of the web server against the blacklist 111 and determine whether the web page address is in the blacklist 111. If yes, the gateway device 11 will not allow that active network device 13 to make such connection. Therefore, user A can add to the blacklist 111 particular web page addresses that are decided to be blocked from different users B (e.g., user A's children), and these web page addresses will be stored into the blacklist 111 at locations that correspond respectively to the network device identification codes of the active network devices for use by users B, with a view to increasing network security and facilitating the management thereof. In addition to the blacklist 111, the storage unit 12 of the gateway device 11 includes a white list 112. The white list 112 also records the network device identification codes of all the active network devices 13 to which the gateway device 11 has connected. When the user (say, user A) wishes to create a white list for the active network device 13 for use by another user (say, user B) and add the address of a certain web page to the white list 112, user A can operate the active network device 13 in hand by clicking the icon in the network device map that corresponds to the active network device 13 for use by user B. Once the icon is selected, the browser of the active network device 13 currently used by user A displays a setting screen (not shown). Herein, a "white list" refers to a list that is stored in a network device, stores a plurality of web page addresses, and functions in such a way that the network device is allowed unconditional access to servers corresponding the web page addresses in the white list. After user A inputs the intended web page address into the setting screen via the active network device 13 in hand, this active network device 13 sends a white list write-in instruction to the gateway device 11, wherein the white list write-in instruction includes at least one web page address and a network device identification code. Upon reading the web page address and the network device identification code in the white list write-in instruction, the gateway device 11 stores the web page address into the white list 112 at a location corresponding to the network device identification code. Thus, user A can easily manage the blacklists or white lists created for other active network devices 13 in the network system.

It should be noted that the terminology used herein to describe the embodiments of the present invention is descriptive only and should not be construed as a limitation of the present invention. As can be understood by a person skilled in the art, the concept of the disclosed method can be implemented by other structures, devices, and systems so as to achieve the objects of the present invention. Therefore, the scope of the present invention is by no means restricted by the foregoing embodiments. All equivalent changes which are based on the technical contents disclosed herein and readily conceivable by a person skilled in the art should fall within the scope of the present invention. Furthermore, the icons and names depicted and used in the accompanying drawings and the description of the embodiments are provided only to facilitate illustration and allow the general public or those in the related industry to rapidly comprehend the substance and essence of the disclosed contents; hence, the present invention is not limited to the hardware system structures shown. In practice, a person skilled in the art who has learned the technical features of the present invention may change the shapes of the icons, the names of the buttons, and the names of the network devices as appropriate.

What is claimed is:

1. A method for providing a network map through a gateway device and thereby assisting a user in managing peripheral network devices, the method being applicable to a network system comprising the gateway device and at least an active network device or at least a passive network device, wherein the gateway device has a map web page, an icon list and a blacklist or a white list stored therein and is connected to each said active network device or each said passive network device, the icon list has a plurality of icons stored therein and each corresponding to a network device type, and each of the blacklist or the white list is configured to record network device identification codes of all said active network devices that the gateway device has been connected to; the method comprising the steps, performed by the gateway device at every predetermined interval upon being activated, of:

searching for said active network device or said passive network device that the gateway device is currently connectable to, and reading basic data of each said active or passive network device found;

identifying the network device type of each said active or passive network device found according to the basic data read, and reading the icon from the icon list which corresponds to each said network device type identified;

integrating the icons read and the basic data read into the map web page to create a network device map web page and then converting the network device map web page into a web page message;

reading a service request instruction upon determining that the service request instruction is received from said active network device, and sending the web page message to the active network device so as for the active network device to display the network device map web page in an icon-based way through a browser thereof;

receiving a blacklist write-in instruction or a white list write-in instruction from the browser of the active network device, and reading a web page address and said network device identification code contained in the blacklist write-in instruction or the white list write-in instruction; and storing the web page address into the blacklist or the white list at a location corresponding to the network device identification code.

2. The method of claim 1, further comprising the steps, performed by the gateway device after sending the web page message to the active network device, of:

receiving a change instruction from the browser of the active network device, and reading a setting request and the network device identification code of the active network device contained in the change instruction;

converting contents of the setting request into a setting message, and storing the setting message into the gateway device at a location corresponding to the network device identification code of the active network device; and determining, before sending a subsequent web page message to the active network device, whether the location corresponding to the network device identification code of the active network device stores said setting message, and executing contents of the setting message if yes.

3. The method of claim 1, wherein the gateway device is provided with a register in which each network device that the gateway device is connected to is entered.

4. A method for providing a network map through a gateway device and thereby assisting a user in managing peripheral network devices, the method being applicable to a network system comprising the gateway device and at least an active network device or at least a passive network device, wherein the gateway device has a map web page, an icon list and a blacklist or a white list stored therein and is connected to each said active network device or each said passive network device, the icon list has a plurality of icons stored therein and each corresponding to a network device type, and each of the blacklist or the white list is configured to record network device identification codes of all said active network devices that the gateway device has been connected to; the method comprising the steps, performed by the gateway device at every predetermined interval upon being activated, of:

searching for said active network device or said passive network device that the gateway device is currently connectable to, and reading basic data of each said active or passive network device found;

identifying the network device type of each said active or passive network device found according to the basic data read, and reading the icon from the icon list which corresponds to each said network device type identified;

reading a service request instruction upon determining that the service request instruction is received from said active network device, and integrating the icons read and the basic data read into the map web page to create a network device map web page and then converting the network device map web page into a web page message;

sending the web page message to the active network device so as for the active network device to display the network device map web page in an icon-based way through a browser thereof;

receiving a blacklist write-in instruction or a white list write-in instruction from the browser of the active network device, and reading a web page address and said network device identification code contained in the blacklist write-in instruction or the white list write-in instruction; and storing the web page address into the blacklist or the white list at a location corresponding to the network device identification code.

5. The method of claim 4, further comprising the steps, performed by the gateway device after sending the web page message to the active network device, of:
receiving a change instruction from the browser of the active network device, and reading a setting request and the network device identification code of the active network device contained in the change instruction;
converting contents of the setting request into a setting message, and storing the setting message into the gateway device at a location corresponding to the network device identification code of the active network device; and
determining, before sending a subsequent web page message to the active network device, whether the location corresponding to the network device identification code of the active network device stores said setting message, and executing contents of the setting message if yes.

* * * * *